Oct. 12, 1954   A. W. SKOOG   2,691,529
PHONOGRAPH STYLUS LIFTING CAM AND BACKSPACING MECHANISM
Filed Aug. 30, 1948   4 Sheets-Sheet 1
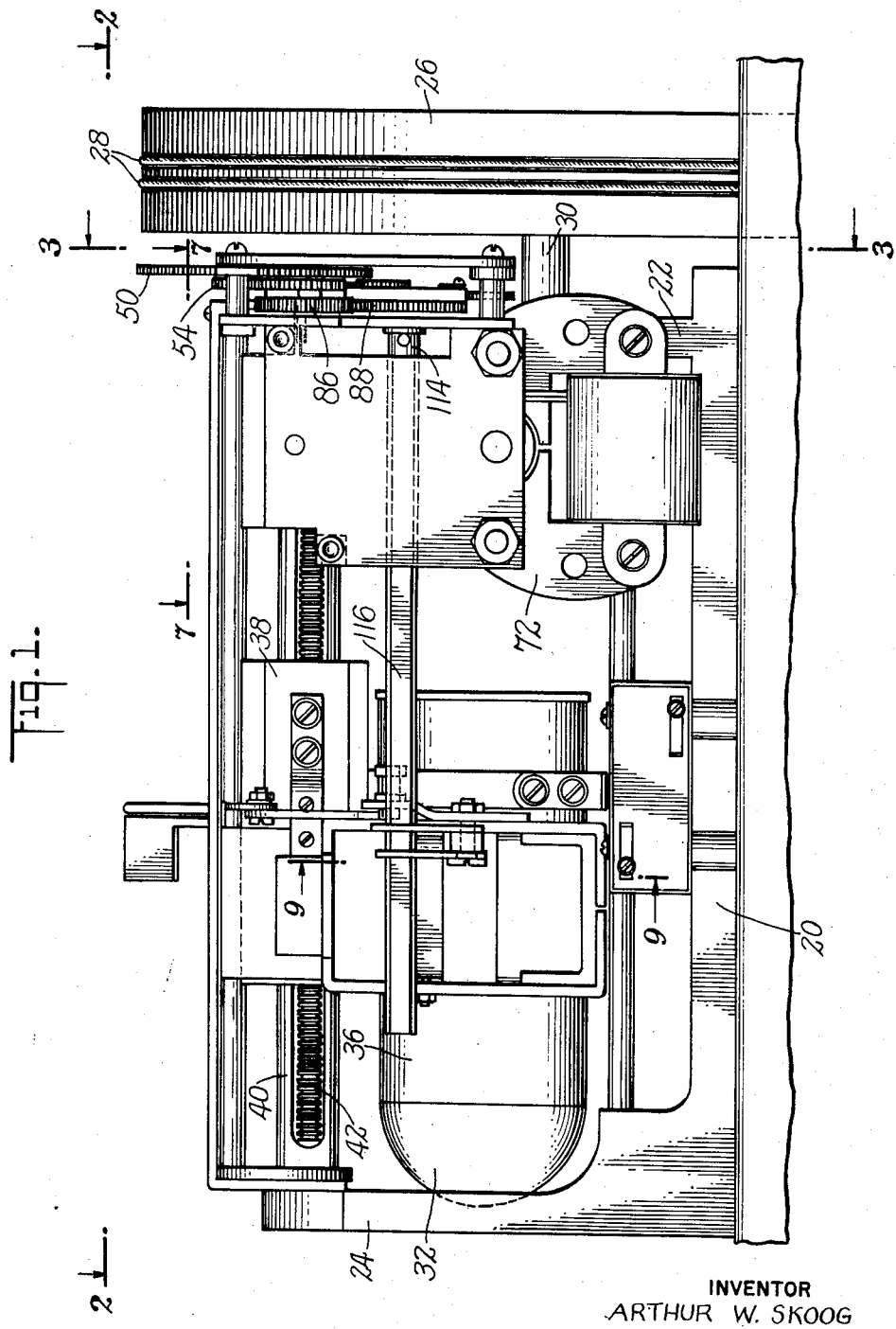
INVENTOR
ARTHUR W. SKOOG
BY
Blair, Curtis + Hayward
ATTORNEYS Oct. 12, 1954   A. W. SKOOG   2,691,529
PHONOGRAPH STYLUS LIFTING CAM AND BACKSPACING MECHANISM
Filed Aug. 30, 1948   4 Sheets-Sheet 2
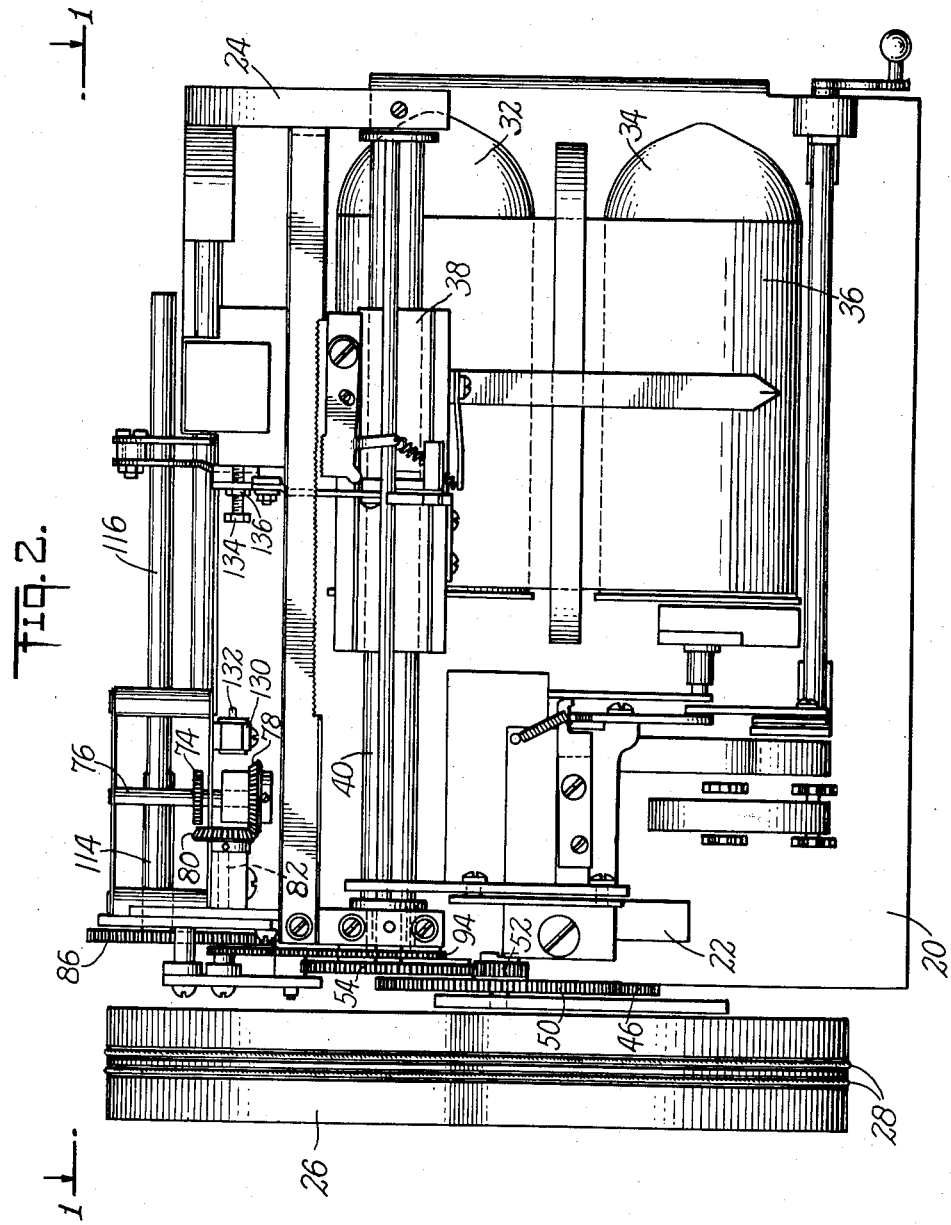
INVENTOR
ARTHUR W. SKOOG
BY
Blair, Curtis + Hayward
ATTORNEYS Oct. 12, 1954     A. W. SKOOG     2,691,529
PHONOGRAPH STYLUS LIFTING CAM AND BACKSPACING MECHANISM
Filed Aug. 30, 1948     4 Sheets-Sheet 3
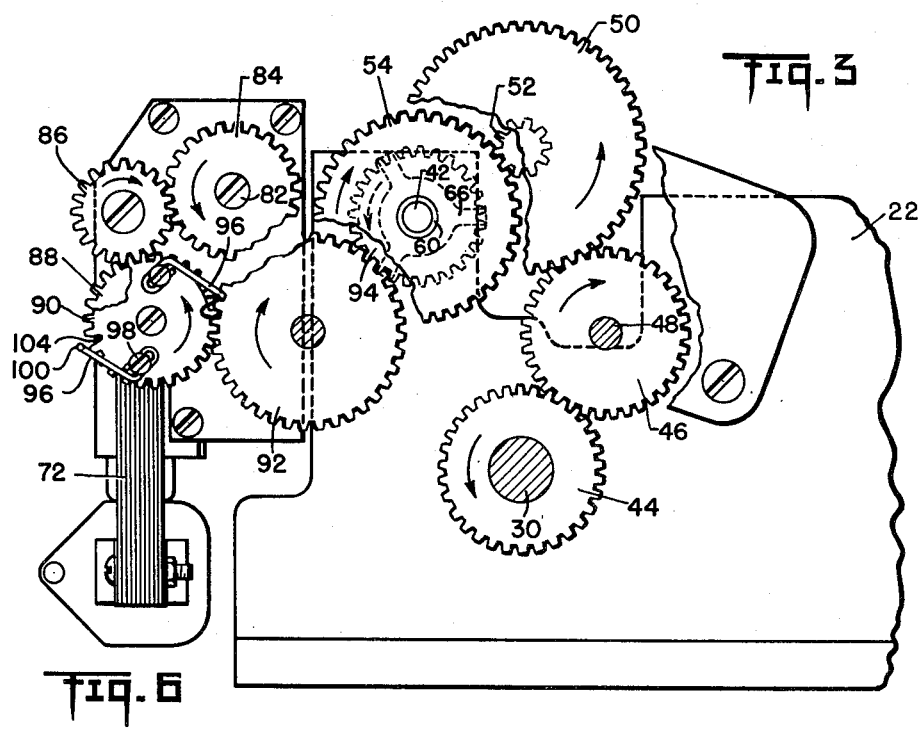
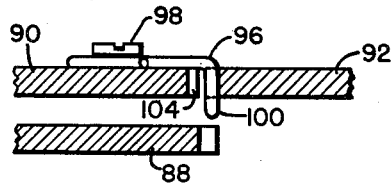
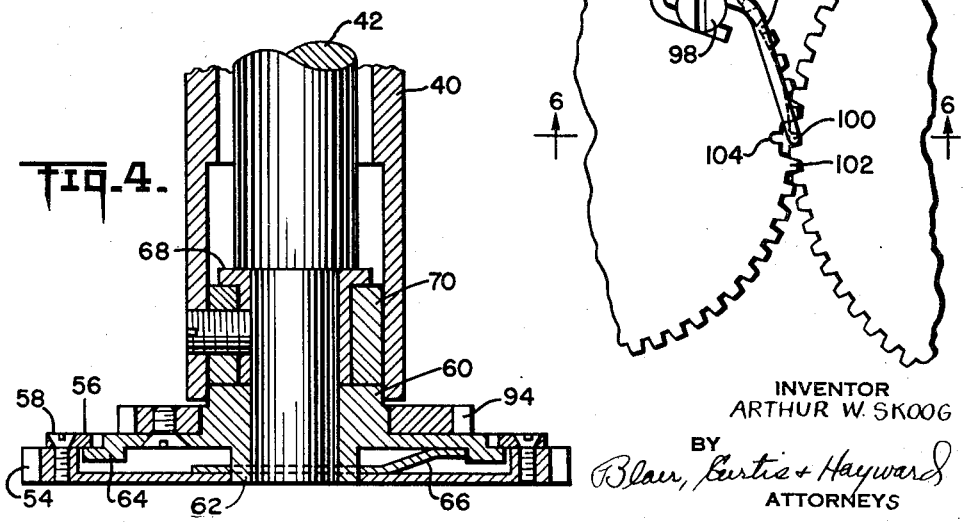
INVENTOR
ARTHUR W. SKOOG
BY
Blair, Curtis + Hayward
ATTORNEYS

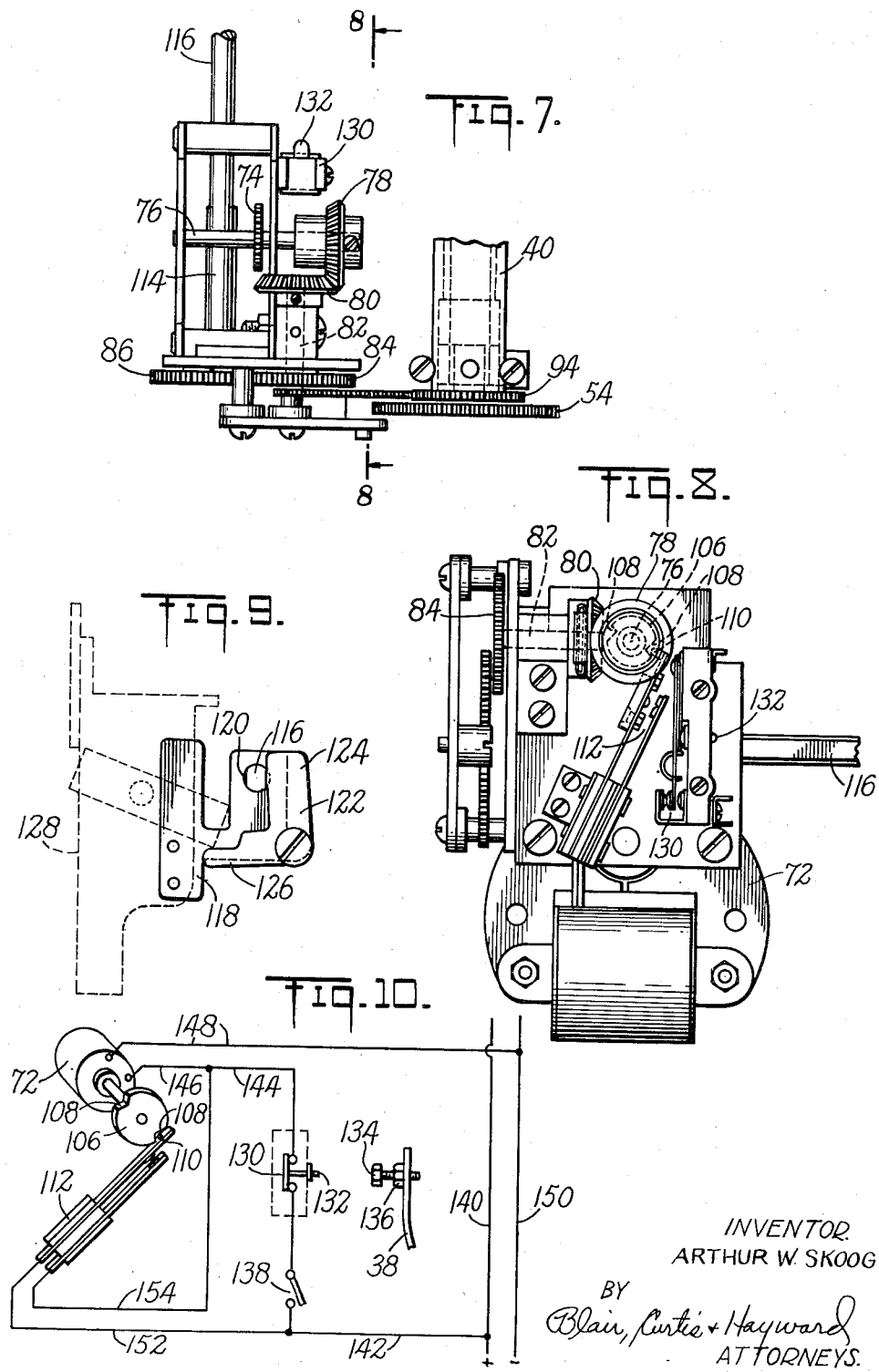

Patented Oct. 12, 1954

2,691,529

UNITED STATES PATENT OFFICE 2,691,529

PHONOGRAPH STYLUS LIFTING CAM AND BACKSPACING MECHANISM

Arthur W. Skoog, Bridgeport, Conn., assignor to Dictaphone Corporation, Bridgeport, Conn., a corporation of New York Application August 30, 1948, Serial No. 46,752

2 Claims. (Cl. 274—21)

This invention is described in relation to variable speed sound reproducing equipment and in such equipment more particularly to a commercially practicable backspacing construction by which the sound reproducing element may quickly and automatically be caused to assume a position from which to repeat a predetermined amount of the recording being reproduced. Recording and reproducing equipment generally is well known and has commonly been used by typists and the like while making written transcriptions of recorded material. Sometimes while making such transcriptions it becomes necessary to have repeated a brief portion of the recording. I am aware that various backspacing mechanisms for accomplishing such repetitions have heretofore been offered. I have devised a stylus lifting and lowering construction which is ideally suited to rapid performance of intermittently desired backspacing operations and which is readily adaptable to other applications which will suggest themselves to those skilled in the art of mechanical power supply and transfer.

In United States Patent No. 2,318,828 to Yerkovich and No. 2,371,116 to Yerkovich et al. there are described certain generally similar machines capable of recording on an endless belt of paper-thin pliable plastic material and of reproducing the recordings made on such belts. During recording, one of these belts is stretched between a pair of pulleys, or mandrels, each of a diameter of about 2⅛ in. in the illustrative embodiments, mounted for rotation about substantially parallel, horizontally disposed axes spaced about 2⅝ in. apart. One of the two mandrels is driven and is known as a drive mandrel; the other is free to rotate about its axis and is known as an idler mandrel. The idler mandrel is yieldably mounted so as to hold the recording belt under a small amount of tension against the surface of the drive mandrel.

In the above-mentioned Yerkovich et al. patent the mandrel axes of rotation are disposed in substantially the same horizontal plane. A sound recording head and a sound reproducing head are independently associated with the mandrels for movement through independent paths, parallel to the axes of the mandrels and transversely with respect to the path followed by the surface of the recording belt. Thus a stylus held in the recording head is enabled to impress a sound groove onto the moving belt. And as the belt moves, the recording head is moved transversely at a low constant speed across the surface of the belt so that the groove begins at one side edge of the belt and proceeds around and around the belt and finally ends at the other side edge of the belt. The speed ratios, between linear velocity of a point on the surface of the belt and linear velocity of the recording head as it travels transversely with respect to the movement of the belt, are such that the belt makes 200 complete revolutions while the stylus moves transversely a distance of one inch. Thus the surface of the recording belt, after a sound groove has been impressed upon it, bears a succession of closely spaced loops the distance from the bottom of one groove trough to the bottom of the next adjacent groove trough being approximately .005 in. It is apparent, of course, that the closer the spacing of the loops of the sound groove the greater the number of loops that may be contained on a belt of a given size and accordingly the greater the amount of recorded material that may be impressed upon that belt. Mechanical complications and the finite width of the sound groove per se set a practical limit upon the closeness of adjacent loops.

In the embodiment disclosed in the Yerkovich patent the linear velocity of a point on the recording belt during normal reproducing is disclosed as being on the order of 20 feet per minute. Thus, in ordinary usage, when the auditor who is listening to the recording misses a word or a phrase, she probably will not want a greater amount repeated than is contained in a single sound groove loop on the recording belt. And if the auditor backspaces the reproducing head with respect to the surface of the recording belt a distance, for example, of as much as $\frac{1}{20}$ of an inch it results that she has backspaced a matter of ten sound groove loops, which is surely very much more than she wants repeated. An error in backspacing movement of as much as $\frac{1}{100}$ in. will result in a repetition of twice as much as the auditor intends.

Another complication is introduced by the fact that these machines are commonly used to record a message at a point of origin, to relay the message over a communication channel to a point of destination and there to rerecord the message and repeat it to a transcriber or auditor. For coding purposes, and to make the most efficient use of the communication channel, it is the regular practice to transmit the recorded material over the channel at a rate several times greater than that at which the recording was made. In order to accomplish such transmission the machines are equipped with variable speed motors having a range on the order of 10:1. Thus, a conversation or message recorded at a rate of 150 words per minute might be transmitted at a rate of 1000 words per minute. And the machine at the point of destination must be capable of rerecording at such higher rate and reproducing for transcribing purposes at a rate even below that of the original.

It is obvious that where backspacing accuracy must be in terms of a few thousandths of an inch, the speeds of movement of the parts must be below certain limits or their inertia will introduce such variancies as to render the mechanism undependable. And if the structure is designed for efficient operation at the higher motor speeds, a disproportionate period of time will be consumed by each operation when the motor is running at lower speeds. Thus, whereas a backspacing operation completed in one half a second might be wholly satisfactory to a typist, a delay of even two seconds—only a 4:1 reduction in motor speed—might after a period of transcribing become an excessive annoyance. A reduction on the order of 4:1 for transcribing would not be unusual in the routine conduct of business quite apart from the channel transmission capabilities of the equipment.

Accordingly it will be understood that a satisfactory backspacing mechanism for a modern machine such as referred to not only must accurately backspace within a few thousandths of an inch but it must perform its function without appreciable passage of time regardless of the speed setting of the main motor or drive mandrel.

Various mechanisms and subassemblies have been suggested and tried in the past for effecting automatic backspacing operations under such circumstances. I have devised a cam construction which will consistently and smoothly lift and lower the reproducing head during a backspacing operation independently of the distance backspaced. My construction can be efficiently actuated by a sufficiently small amount of power to permit it to be used in a commercially feasible machine. Furthermore, my construction operates without moving the entire reproducer control lever and interlock system but, on the contrary, acts only on the reproducer unit itself.

I shall describe my invention as it may be applied to a reproducing machine of the general type disclosed in the Yerkovich et al. patent. Accordingly, in my illustrative embodiment, backspacing of one sound groove will require a transverse movement of the reproducing head equal to the spacing between adjacent sound groove loops where there are two hundred loops to the inch. It is to be noted that the illustrative embodiment of the Yerkovich et al. patent is a recorder-reproducer; for simplicity and to avoid repetition the machine which I have selected to exemplify my invention is a reproducer only. Machines which will be used only for reproducing omit those parts which are required only for recording.

It is an object of my invention to provide a device of the character described having to a notable extent the characteristics and capabilities set forth. Another object is to produce a commercially practicable backspacing subassembly which is operable upon demand independently of the position of the reproducing head along the sound record. A further objective is the provision of a backspacing structure which is both feasible in manufacture and foolproof in operation and which requires only a negligible amount of actuating power. A further object is to provide a novel sort of stylus lifting cam having a minimum number of parts. Yet a further objective resides in the provision of a lifting cam mechanism of general utility which overcomes certain disadvantages inherent in certain assemblies of the prior art which were intended to perform similar functions. Another object is to provide an arrangement whereby the stylus will be gently lifted from the recording surface at the beginning of a backspace movement and gently lowered to correct position at the end of the movement and which arrangement is dynamically balanced to such an extent that the inertia of the parts involved in the movement ceases to be a limiting factor. Another object is to provide a reproducer lifting mechanism which functions without moving the entire reproducer control and interlock system. Other objectives will be in part pointed out as the description proceeds and will in part become apparent therefrom.

The invention accordingly consists in the features of construction, combinations of elements, methods of operation, and arrangements of parts as will be exemplified in the structure and sequences and groups of related steps to be hereinafter described and the scope of the application of which will be set forth in the accompanying claims.

In this specification and the accompanying drawings I have shown and described a preferred embodiment of my invention and suggested various modifications thereof; but it is to be understood that these are not intended to be exhaustive nor limiting of the invention, but, on the contrary, are given for purposes of illustration in order that others skilled in the art may fully understand the invention and the principles thereof and the manner of applying it in various forms, each as may be best suited to the conditions of a particular use.

In the drawings: Figure 1 is a rear elevation (taken along the line 1—1 of Figure 2) of a sound reproducing machine of the type disclosed in the Yerkovich et al. patent and in which my invention has been incorporated;

Figure 2 is a plan view (taken along the line 2—2 of Figure 1) of the machine;

Figure 3 is a sectional end view taken along the line 3—3 of Figure 1;

Figure 4 is a fragmentary view on an enlarged scale of a friction clutch assembly which is employed in the machine;

Figure 5 is a fragmentary view on an enlarged scale of a mutilated gear assembly which forms a part of the illustrative form;

Figure 6 is a sectional view taken along the line 6—6 of Figure 5;

Figure 7 is a fragmentary view taken along the line 7—7 of Figure 1 showing a part of the backspacing gearing and related mechanisms;

Figure 8 is a sectional view taken along the line 8—8 of Figure 7;

Figure 9 is a fragmentary sectional view taken on an enlarged scale along the line 9—9 of Figure 1; and Figure 10 is a diagrammatic representation of certain of the electrical circuits and some of the parts related thereto.

The machine shown in Figure 1 includes a machine frame 20, which may take the form of a metal casting, and which includes a supporting plate 22 rising from its right-hand end (see Figure 1) and a supporting plate 24 rising from its left-hand end. A relatively heavy fly wheel 26 is disposed in a substantially vertical plane at one end of the machine for rotation about a horizontal axis. Fly wheel 26 is driven by a pair of belts 28 from a variable speed motor. For a more complete disclosure of the motor arrangement and of other conventional aspects of the present embodiment not otherwise detailed herein reference should be made to the disclosure of Yerkovich et al. Patent No. 2,371,116.

The fly wheel is mounted upon a fly wheel shaft 30 (see Figure 1) journaled in supporting plate 22 and carried by the machine frame. Drive mandrel 32 is turned by means of fly wheel shaft 30; since the motor which drives the fly wheel is of the variable speed type the rate at which the drive mandrel is turned is variable in accordance with the motor speed. Ordinarily a constant speed is used throughout any one recording, variations in speed being employed for transcribing purposes to pace the rate of reproduction to the optimum capacity of the typist or auditor. An idler mandrel 34 (see also Figure 2) is disposed for free rotation about an axis parallel to the axis of rotation of drive mandrel 32. A recording belt 36 is placed around and stretched by the mandrels and as drive mandrel 32 is rotated, the belt, which is held against the drive mandrel by the yieldable mounting of the idler mandrel, is driven and transfers rotation from the drive mandrel to the idler mandrel while it is held smoothly taut.

A reproducing carriage 38 is disposed above the drive mandrel for transverse movement with respect to the path through which the belt moves. The reproducing carriage is slidable upon a horizontally disposed carriage guide rod 40 (see Figures 1 and 2) held between supporting plates 22 and 24. The carriage is caused to slide along the carriage guide rod by a feed screw 42 (see Figure 1) positioned in conventional manner within the guide rod. The axis of the feed screw is substantially coextensive with the axis of the carriage guide rod. A feed nut, not shown but held within the carriage, meshes constantly with the feed screw so that rotation of the screw advances or backspaces the carriage with respect to the recording belt depending upon the direction of rotation of the feed screw.

In normal transcribing the feed screw is driven from the fly wheel shaft by a gear train mechanism, to be described. Feed screw 42 is identical to the feed screw used with the recording carriage. Hence the reproducing carriage is advanced across the moving belt at a rate which makes it possible for the reproducing stylus to follow exactly the sound groove which was embossed in the belt by the recording stylus. In the described embodiment the feed screw is rotated through 120 degrees while the recording belt is making one revolution. Accordingly, in order to backspace one sound groove, the feed screw will have to be reversed through an angle of 120 degrees.

As shown in Figure 3, fly wheel shaft 30 drives a fly wheel gear 44 held in mesh with an intermediate gear 46 on an intermediate shaft 48. Gear 46 is maintained in meshing relationship with a second intermediate gear 50 which turns a pinion 52 constantly meshed with a feed screw gear 54. The effect of this gear train is to reduce the number of revolutions made by the feed screw gear as compared to the number of revolutions made by the fly wheel shaft.

In accordance with the invention disclosed and claimed in the application of Simon Yerkovich, Serial No. 46,747, filed August 30, 1948, now Patent No. 2,664,293, issued December 29, 1953, the drive relationship between feed screw gear 54 and feed screw 42 is not positive in the illustrative embodiment. As shown in Figure 4, feed screw gear 54 has secured to its inner face an annular rim 56. This rim may be removed, if need be, by unscrewing machine screws 58. A drive flange 60 is keyed in driving relationship to feed screw 42; feed screw gear 54 is freely rotatable upon a hub 62 of drive flange 60. Feed screw gear 54 is held in position upon hub 62 by rim 56, which overlaps peripheral portions 64 of flange 60. Feed screw gear 54 may be removed by removing machine screws 58 so that the gear can be separated from annular rim 56. A spider spring 66 (see also Figure 3) is also rotatably positioned on hub 62 and is normally compressed between the opposing faces of the inside of gear 54 and the outside of flange 60. Thus the spider spring tends to push gear 54 axially off of hub 62 but rim 56 prevents any separation more than that shown in Figure 4. Accordingly, feed screw gear 54 is held relatively firmly with respect to flange 60 and ordinarily the driving force imparted to feed screw gear 54 by pinion 52 is transferred through flange 60 to the feed screw to cause operative rotation thereof. The feed screw is mounted for rotation in a feed screw bearing 68 supported within a bearing bushing 70 conventionally held within carriage guide rod 40. The carriage guide rod, as pointed out previously, is nonrotatably fixed between supporting plates 22 and 24.

In the present embodiment there is provided, as disclosed in Figure 3, a small self-starting motor 72 (see also Figures 1 and 8); this motor I use, as will be described, to effect reverse rotation of the feed screw. The motor (see Figure 7) drives a spur gear 74 mounted upon a motor countershaft 76 which drives a bevel gear 78 held in meshing relationship with a bevel gear 80 which gear in turn is locked to and drives a shaft 82 (see also Figure 3). A gear 84 driven by shaft 82 is in mesh with and drives an intermediate gear 86 which in turn meshes with and drives a spur gear 88 (see Figure 6). A mutilated gear 90 (a part of which is broken away in Figure 3 to show gear 88 juxtaposed therebehind) is disposed coaxially with respect to gear 88 and is rotated thereby.

Mutilated gear 90 is arranged to mesh with an intermediate gear 92 which gear is in mesh with a backspacing gear 94 solidly secured to flange 60 (see also Figure 4). During ordinary operation of the transcribing equipment a mutilated portion of gear 90, as will be described, faces gear 92 so that there is no driving relationship therebetween and accordingly feed screw 42 is driven through the friction clutch between gear 54 and flange 60. However, when it is sought to effect a backspacing operation, the small electric motor 72 is energized, as will be described, and the train of gears including members 74, 78, 80, 84, 86 and 88 comes into operation to move mutilated gear 90 into meshing relationship with gear 92 to cause reverse rotation of backspacing gear 94. During the reverse movement of gear 94 the main machine motor continues to drive the fly wheel and accordingly a slipping occurs between flange 60 (now moved by gear 94) and gear 54 (driven from the fly wheel). The energization of motor 72 is of limited and predetermined duration, as will be developed hereinafter, so that the reverse movement of backspace gear 94 extends through 120 degrees. As will be described, gear 92 is then again unmeshed from mutilated gear 90.

It is to be observed that the fly wheel turns at its ordinary speed whether a backspacing operation is occurring or not and accordingly the train of gears which ordinarily drives the feed screw continues to operate at its normal rate of speed. When a backspacing operation is called for, however, the drive is broken at the frictional coupling and the backspacing mechanism takes precedence as it meshes with moving gear 92 to effect the intended backspacing operation.

Because normal fly wheel operation is uninterrupted some provision must be made for enabling the backspacing mechanism to be meshed into the drive to the feed screw. Since there is no interruption of the main motor, it is obvious that ordinary gearing, Geneva mechanisms, and the like would jam unless the engaging parts happened by chance to fall into mesh. It is equally evident that the backspacing movement must be of a measured amount which can invariably be imposed at will upon the normal drive and which will be independent of the speed adjustment at which the normal drive is running. As disclosed and claimed in the copending application of Charles L. Bossmeyer, Serial No. 773,823, filed September 13, 1947, now U. S. Patent No. 2,613,938, issued October 14, 1952, the mutilated gear may be made to mesh properly with gear 92 each time power is supplied to the backspacer motor by providing the mutilated gear with a flexible feeler 96 which is clamped in place by a clamp screw 98 on the peripheral portions of gear 90. The feeler is formed in the present embodiment from stiff wire similar to piano wire and has a cross sectional diameter which is approximately equal to the chordal thickness of one of the teeth of the mutilated gear. The feeler is provided at its outer end portion with a detent 100 (see Figure 6) formed by a right angle bend in the wire. The axis of this detent is substantially parallel to the axis of rotation of the gear. The feeler is so adjusted and held in place by clamp screw 98 that detent 100 occupies approximately the region in space that would be occupied by the working part of a tooth of gear 90 if there were another tooth beyond tooth 102. Actually, the detent is adjusted so as to extend slightly beyond the outside diameter of the toothed portion of the mutilated gear. In addition, the detent is spaced from tooth 102 slightly more than the normal spacing between two adjacent gear teeth. The location shown of clamp screw 98 with respect to tooth 102 and the configuration of feeler 96 are such that as the mutilated gear rotates toward meshing relationship with gear 92, the first contact made is between detent 100 and some tooth portion of gear 92. With the arrangement shown, the inherent flexibility of feeler 96 is such that even if the detent should in the first instance be squarely abutted against an outer end of a tooth, the detent will yield inwardly toward the center of the mutilated gear and, as the approaching gears tend to move at different peripheral rates, will find its way into the solid line position illustrated in Figure 6 between two of the teeth of gear 92. When the detent assumes the location illustrated, gears 90 and 92 are oriented so that the rigid teeth will mesh perfectly. Thus, no matter what the angular relationships between and peripheral speeds of the unmeshed gears may be, when a driving force of rotation is applied to the mutilated gear, feeler 96 and detent 100 automatically align the teeth of gears 90 and 92 so that they are brought into proper mesh. Gear 90 is relieved by a clearance groove 104 across its edge into which the detent may upon occasion enter.

When a backspacing operation is called for, the feed screw must be turned backwardly rapidly through 120 degrees. Hence, gear 92 must be rotated through a finite number of degrees and to do this there must be a certain number of teeth in the toothed portion of the mutilated gear in order that gear 92 shall be turned through the correct angle. In the embodiment here described (see Figure 3) the mutilated gear is provided with two toothed portions, each portion having ten teeth, and each portion is provided with an advance feeler 96 carrying a detent 100. The detent serves as an additional tooth, making eleven operative teeth on each side of the gear. And the mutilated gear must be turned through 180 degrees to bring the eleven effective teeth of one of its toothed portions into and out of mesh with the opposing teeth of gear 92 so as to turn the feed screw backwardly through 120 degrees. Thus with a single backspacing operation, eleven teeth of gear 92 are caused to reverse the direction of normally ineffective backspacing gear 94 (see also Figure 4). The friction clutch between feed screw gear 54 and backspacing gear 94 has a damping effect on any overrunning which might otherwise occur from the inertia of the parts so that when the eleven teeth of gear 92 have done their work there is a clean break from the backspacing movement and gear 94 now finds itself displaced backwardly through the friction clutch an accurately measured, predetermined amount. The feed screw also, of course, has been turned back through the same measured amount. The over-all time cycle required for a complete operation and the amount of feed screw reverse displacement remain constant under all conditions and are accomplished independently of the speed at which the variable speed motor is turning.

The backspacing gear train is such that for one half a revolution of countershaft 76 there follows a one-half revolution by the mutilated gear. One end of countershaft 76 carries a timing cam 106 (see Figure 8). Cam 106 is provided with a pair of diametrically spaced dwells 108. During ordinary transcribing operation, a foot 110 of a normally open short travel limit switch 112 occupies the space within one of the cam dwells 108. When the backspacer motor circuit is closed, however, and countershaft 76 is caused to rotate, the rise on cam 106 comes into engagement with foot 110 and switch 112 closes a holding circuit which, once closed, remains closed until motor 72 has turned countershaft 76 through 180 degrees again to present a dwell 108 to foot 110 so as to enable holding switch 112 to open and deenergize the backspacer motor circuit. Thus, a momentary closing of the backspacer motor circuit suffices to initiate movement of countershaft 76 and thereafter, through the action of holding switch 112, the backspacer motor continues automatically to operate the exact length of time required not only to turn countershaft 76 through 180 degrees but also to turn mutilated gear 90 through 180 degrees and accordingly to turn feed screw 42 backwardly through 120 degrees. During such operation of the backspacer motor and by virtue of the frictional coupling which is incorporated in the variable speed motor drive to the feed screw the variable speed motor continues to operate. As soon as the backspacer motor has caused the feed screw to reverse through 120 degrees ordinary transcribing motion is restored to the feed screw automatically and without pause.

When feed screw 42 is reversed, reproducing carriage 38 is caused to move to the left, as shown in Figure 2, by one sound groove loop. It is desirable that the reproducing stylus which ordinarily rides in the sound groove be lifted from the surface of the recording medium while the reproducing carriage is being backspaced. Accordingly I provide mechanism which automatically synchronizes with a backspacing operation to lift the stylus of the reproducing carriage off of the surface of the recording medium at the beginning of a backspacing operation and to set it down gently at the end of a backspacing operation. The stylus and the reproducing head can, of course, be lifted from the recording surface in a machine of the present type by the standard manual control system, as described in detail in the Yerkovich et al. patent. Machines of this type include as standard equipment a relatively complex system of interlocks whereby operation is rendered substantially foolproof. I do not use the regular control system mechanism in lifting and lowering the stylus for a backspacing operation, however. Automatic backspacing, as already pointed out, must be accomplished accurately and in a minimum of time and with a minimum of noise. The inertia of the parts of an ordinary control and interlock system which move in performing an operation becomes a considerable factor when the operation must be completed in a fraction of a second and when accuracy in the position of the stylus must be maintained within a few thousandths of an inch. In accordance with my invention the stylus is lifted and lowered smoothly and accurately without resort to the ordinary control mechanism; and the entire structure has only a low inertia value and includes no reversal of direction of a rapidly moving part.

As shown in Figure 3, gears 88 and 90 are located upon a shaft 114 (see also Figure 2). This shaft includes an extended portion 116 which reaches behind reproducing carriage 38 even when this carriage is in its extreme right-hand position. Portion 116 throughout its length behind the path of travel of the reproducer carriage has a non-circular cam-like cross section (see also Figure 9). The reproducer carriage is provided with a bracket 118 (see Figure 9) which includes an opening 120 through which cam-like portion 116 extends. Bracket 118 serves as a pivot support for a bell crank lever 122 (see Figure 9) normally urged by gravity in a counterclockwise direction so that its upper arm 124 bears slidably upon the flat vertical face of portion 116 as the reproducing carriage is moved by the feed screw during normal operation. However, when a backspacing operation is instituted and shaft 114 and its cam-like portion 116 are caused to turn, bell crank lever 122 is caused to rotate through a small angle in a clockwise direction and is there held until portion 116 is turned through 180 degrees. While the bell crank lever is held against gravity in its clockwise position, its other arm 126 is raised somewhat from the position illustrated in Figure 9 and in its raised position it is in lifting contact with the underside of the bottom edge of transducing cartridge 128 of the reproducing carriage. The stylus is conventionally mounted in this cartridge and is held elevated slightly off the recording medium during the period while bell crank lever 122 occupies its clockwise position. It is during this period that the feed screw is rotated backwardly. This construction obviously raises and lowers the stylus with a smooth, gentle motion which cannot damage the delicate point.

As shown in Figure 8, a normally-closed low travel limit switch 130 is fixed in position near switch 112 with its switch-throwing button 132 so disposed as to be engaged and actuated by the head of a screw 134 (see Figure 2) mounted in the left-hand face of the reproducing carriage. The position of screw 134 with respect to the reproducing carriage may be adjusted and locked by an adjustment nut 136. Thus, when carriage 38 is moved to its most left-hand position at the beginning of a reproducing operation, screw 134 is brought into contact with button 132 so as to open switch 130. With switch 130 open the circuit of the backspacing motor is open so that a backspacing operation cannot be instituted; switch 130 will not close until the reproducing carriage is moved from its most left-hand position. In this manner it is made impossible for the backspacing motor to be energized unless the reproducing carriage is in a position from which it may be backspaced without jamming.

Figure 10 indicates diagrammatically the electrical circuit of the backspacing motor. As here shown, a backspacing operation is instituted by momentarily closing a normally open switch 138. Ordinarily this switch is arranged for foot operation. When switch 138 is closed current flows from a supply line 140 through a branch line 142, switch 138, normally closed safety switch 130, and branch lines 144 and 146 into motor 72, thence to a branch line 148 and back to main line 150. When switch 138 is closed motor 72 starts and cam 106 immediately operates to close holding switch 112. Power is then available through branch line 154 to branch line 146 and thence through the motor and line 148 to line 150. Thus, when the starting switch is closed, holding switch 112 assures that a complete backspacing operation is accomplished. When the reproducing carriage is moved to its most left-hand position, however, screw 134 comes into contact with button 132 and opens switch 130. As long as switch 130 is open nothing is accomplished by closing switch 138 and so backspacing is prevented until such time as the reproducing carriage is moved to a position from which it may be backspaced without jamming.

From the foregoing it will be seen that a backspacing structure made in accordance with the present invention is well adapted to attain the ends and objects hereinbefore set forth and to be economically manufactured since the several parts and assemblies are suited to common production methods and are susceptible to a wide latitude of variations as may be desirable in adapting the invention to different applications.

As various embodiments may be made of the above invention and as changes might be made in the embodiment above set forth, it is to be understood that all matter hereinbefore set forth or shown in the accompanying drawings is to be

I claim:

1. In sound reproducing apparatus of the type wherein a stylus follows a continuous sound groove disposed in closely spaced loops on the surface of a recording medium, in combination; a feed screw, a stylus assembly normally constantly meshed in driving relationship with said feed screw, a reproducing drive motor, reproduce drive mechanism in forward drive relationship with said feed screw actuated by the drive motor to cause relative forward movement between stylus assembly and recording medium, a backspace drive motor, backspace drive mechanism in reverse drive relationship with said feed screw actuated by the backspace motor to cause a backspacing movement of the stylus assembly with respect to the recording medium, and a low inertia cam construction including an elongated cam extending along the path traversed by said stylus assembly during forward or reverse movement, a continuous mechanical connection between said stylus and said cam and a rotatable element on said cam coupled to the backspace drive mechanism, whereby said cam is actuated by the backspace drive motor to transfer motion to the stylus to lift the stylus from the recording medium during a backspacing operation.

2. In a sound reproducing apparatus of the type wherein a sound reproducing element follows in scanning relationship along a continuous sound track disposed in closely spaced loops on the surface of a driven recording medium, means for producing automatic, quick-acting backspacing of said reproducing element from scanning relationship with one of the loops of said sound track into scanning relationship with another loop of said sound track comprising: a reproducer carriage including a sound reproducing element, a mounting structure supporting said carriage for travel along a path transverse with respect to the sound track loops, a feedscrew for moving said carriage along its path, a feedscrew-engaging member on said carriage normally constantly meshed in driving relationship with said feedscrew, said sound reproducing element being movably mounted on said mounting structure independently of said feedscrew-engaging member so as to be movable out of and back into scanning relationship with respect to the sound track loops while said feedscrew-engaging element remains meshed in driving relationship with said feedscrew, an elongated rotatable cam having its axis disposed substantially parallel and adjacent to the path travelled by said carriage, a mechanical engagement between said elongated cam and said sound reproducing element arranged to move said sound reproducing element out of and back into scanning relationship with respect to the sound track loops upon rotation of said cam, a reproduce drive mechanism normally in forward drive relationship with said feedscrew to rotate said feedscrew in a forward direction to cause relative forward movement between said sound reproducing element and the recording medium, a high-speed backspace drive mechanism in reverse drive relationship with said feedscrew, said backspace drive mechanism being arranged when actuated to rotate said feedscrew at high speed in reverse direction to cause a high-speed backspacing movement of said sound reproducing element with respect to the recording medium, a rotatable element in said backspace drive mechanism, said rotatable element being rotated by said backspace drive mechanism when said backspace drive mechanism is actuated, said cam being coupled to said rotatable element to be driven thereby so that said cam is rotated when said backspace drive mechanism is actuated, a manually-operable backspace control member for initiating backspacing operation, a reverse drive control responsive to operation of said backspace control member to interrupt said reproduce drive mechanism and to actuate said backspace drive mechanism to cause said high speed backspacing movement of said sound reproducing element, a time-delay control connected to said backspace drive and operated thereby when said backspace drive is actuated, said time delay control producing a control action a predetermined time interval after its operation, said reverse drive control being responsive to said time-delay control action to deactuate said backspace drive mechanism and re-establish said reproduce drive mechanism, whereby operation of said manually-operable backspace control causes automatic quick-acting backspacing.

References Cited in the file of this patent

UNITED STATES PATENTS

| Number | Name | Date |
|---|---|---|
| 859,114 | Rosenfield | July 2, 1907 |
| 1,992,575 | Johnson | Feb. 26, 1935 |
| 2,300,093 | Bayer | Oct. 27, 1942 |
| 2,538,452 | Harrington | Jan. 16, 1951 |
| 2,613,938 | Bossmeyer | Oct. 14, 1952 |